No. 786,673. Patented April 4, 1905.

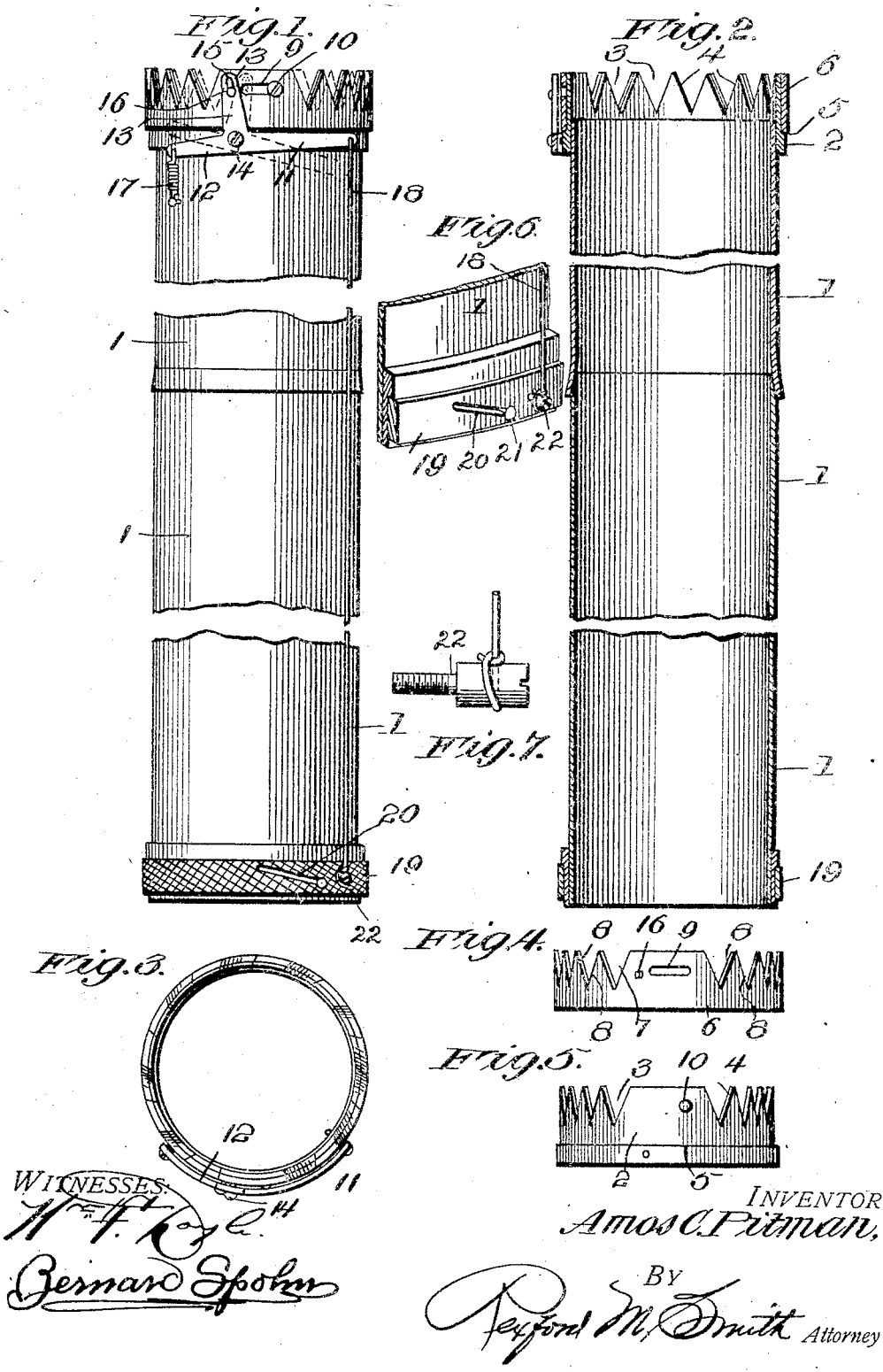

UNITED STATES PATENT OFFICE.

AMOS CHURCHILL PITMAN, OF BROOKLYN, CANADA.

FRUIT-PICKING MACHINE.

SPECIFICATION forming part of Letters Patent No. 786,673, dated April 4, 1905.

Application filed December 28, 1904. Serial No. 238,566.

*To all whom it may concern:*

Be it known that I, AMOS CHURCHILL PITMAN, a subject of the King of England, residing at Brooklyn, in the county of Yarmouth, Province of Nova Scotia, Canada, have invented a certain new and useful Fruit-Packing Machine, of which the following is a specification, reference being had therein to the accompanying drawings.

This invention relates to fruit-picking machines, the object of the invention being to produce a light, portable, and easily-handled implement embodying a light-weight pole or handle of tubular construction, forming a conduit for the fruit, and cutting mechanism of such construction and arrangement as to facilitate and insure the prompt and efficient severing of the stems of the fruit one piece after another, the cutting-blade being located at one end of the tubular handle and under easy and complete control of the attendant by means of a manually-operated device at or near the opposite end of the handle. The handle is of sectional construction, so that it may be lengthened or shortened, as desirable or necessary to adapt it to trees of various sizes.

With the above and other objects in view, the nature of which will more fully appear as the description proceeds, the invention consists in the novel construction, combination, and arrangement of parts, as herein fully described, illustrated, and claimed.

In the accompanying drawings, Figure 1 is a side elevation of the fruit-picking machine. Fig. 2 is a longitudinal sectional view of the same. Fig. 3 is a top plan view of the machine. Fig. 4 is a view in elevation of the movable cutter. Fig. 5 is a similar view of the fixed head or cutter. Figs. 6 and 7 are detail views of parts of the cutter-operating mechanism.

Like reference-numerals designate corresponding parts in all figures of the drawings.

Referring to the drawings, 1 designates the stock or handle of the machine or implement, the said handle being of tubular or hollow construction, as shown, and preferably consisting of sections, in any desired number, adapted to fit one into another for the purpose of enabling fruit to be reached at any desired elevation from the surface of the ground. Any suitable joint may be made where the sections meet and engage each other. For example, they may be made so as to slide or telescope one within the other.

Upon the upper end of the upper section of the handle or stock there is placed a head 2, which also constitutes a fixed cutter. This head is by preference held only by friction on the upper handle-section, so that it may be readily removed; but, if desired, it may be fastened securely on said section in any preferred manner. The upper edge portion of the head is notched or provided with V-shaped incisions or scallops 3 to form oblique or slanting teeth 4, in connection with which the cutter hereinafter described coöperates, the said notches being adapted to receive the stems of the pieces of fruit when the device is pushed upward beneath the same in a manner readily understood.

The head 2 is rabbeted, as shown at 5, to form a seat or bearing for a movable or rotary cutter 6, the latter being adapted to turn or oscillate around the head when actuated by the connections hereinafter described. The cutter 6 is provided with notches 7 and oblique or slanting cutting edges 8, similar to those in the head 2 and of the same size and number to register therewith, as shown in Figs. 1 and 2.

The cutter 6 is provided with a horizontally-elongated slot 9, through which projects a pin or stud 10, which acts to prevent the displacement of the cutter from the head and yet allow a limited amount of rotary movement of the cutter around the head, in which operation the stems of the fruit are severed by the coöperation of the two sets of slanting teeth.

The cutter-operating mechanism comprises a lever having in addition to its main arm 11 a spring-receiving arm 12 and a cutter-connecting arm 13. The lever is arc-shaped to partially embrace the head 2, to which it is pivotally connected at 14. The arm 13 is slotted, as shown at 15, to receive a pin or stud 16, projecting from the movable cutter 6, whereby said lever-arm is adapted to actuate the cutter and partially revolve or turn the same. The arm 12 of the lever is connected by a spring 17 to the upper tubular handle-section, said spring acting to return the cutter to its normal position after it has severed the fruit-stem, in which normal position the teeth or notches of the parts 2 and 6 register.

In order to throw the movable cutter and sever a stem, the main arm of the lever has connected thereto a wire or other flexible strand or cord 18, which extends downward lengthwise of the handle and connects at its opposite or lower end to a hand-operated ring 19, journaled upon the lower end of the lowermost handle-section. The ring 19 has an inclined slot 20, through which projects a limiting guide-pin 21, which acts to depress the ring as the latter is turned. The lower end of the connection 18 passes through a hole in an adjusting or tightening screw 22 and is wrapped around said screw or otherwise secured, so that slack in said connection may be taken up by tightening the screw. The operator by grasping the ring 19 and turning the same as far as the limiting means will permit causes the connection 18 to be drawn downward, thereby actuating the lever and moving the cutter 6, with the result above stated. Upon releasing the ring 19 the spring 17 retracts the several parts of the cutter mechanism in readiness for another operation.

If desired, the connection 18 may be left loose and dangling at its lower end, so that it may be operated by a simple downward pull on the part of the operator. The handle-sections may be connected or jointed at their meeting ends in any way to produce a handle or stock which will be rigid as a whole. These as well as other changes in the form, proportion, and minor details of construction may be resorted to without departing from the principle or sacrificing any of the advantages of the invention.

Having thus described the invention, what is claimed as new, and desired to be secured by Letters Patent, is—

1. A fruit-picking machine comprising a handle, an annular head thereon having teeth, a rotary cutter acting in conjunction with said teeth, a cutter-operating lever partially encircling the head, and means for rocking said lever.

2. A fruit-picking machine comprising a rigid tubular handle, an annular head concentric thereon having teeth, a rotary cutter acting in conjunction with said teeth, a lever partially embracing the head and having a plurality of arms one of which connects with the cutter, and means for rocking said lever.

3. A fruit-picking machine comprising a rigid tubular handle, an annular head thereon provided with teeth, a rotary cutter having a plurality of cutting edges which coöperate with said teeth, a hand-operated ring journaled around the handle, and operating connections between said ring and cutter and operable by turning said ring.

4. A fruit-picking machine comprising a rigid tubular handle, an annular head thereon having teeth, a rotary cutter having a plurality of cutting edges which coöperate with said teeth, a hand-operated ring journaled around the handle, a lever connected with the cutter, and a flexible connection between said ring and lever operable by turning said ring.

5. A fruit-picking machine comprising a rigid tubular conduit handle, an annular head thereon having teeth, a rotary cutter having cutting-teeth which coöperate with the teeth on the head, a cutter-operating lever, a hand-operated ring journaled around the handle, and a flexible connection joining said ring and lever and passing along the side wall of the tubular handle and operable by turning the ring.

6. A fruit-picking machine comprising a tubular handle, an annular head thereon having teeth, a rotary cutter having cutting-teeth which coöperate with the teeth on the head, a spring-retracted cutter-operating lever partially encircling the handle, a hand-operated ring journaled around the handle, and operating connections between said ring and lever.

In testimony whereof I affix my signature in presence of two witnesses.

AMOS CHURCHILL PITMAN.

Witnesses:
W. H. WAY,
JAS. P. DEACY.